(12) United States Patent
Abanami

(10) Patent No.: US 7,889,173 B2
(45) Date of Patent: Feb. 15, 2011

(54) DEFINING USER INPUT FIELDS ON A PORTABLE MEDIA DEVICE

(75) Inventor: Thamer A. Abanami, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 735 days.

(21) Appl. No.: 11/532,001

(22) Filed: Sep. 14, 2006

(65) Prior Publication Data

US 2008/0068341 A1 Mar. 20, 2008

(51) Int. Cl.
G09G 5/00 (2006.01)
(52) U.S. Cl. .................. 345/156; 345/158; 345/169
(58) Field of Classification Search ............... 345/156, 345/158, 169
See application file for complete search history.

(56) References Cited

U.S. PATENT DOCUMENTS

| | | |
|---|---|---|
| 6,009,410 A | 12/1999 | LeMole et al. |
| 6,115,025 A | 9/2000 | Buxton et al. |
| 6,151,208 A | 11/2000 | Bartlett |
| 6,334,063 B1 | 12/2001 | Charlier et al. |
| 6,400,376 B1 | 6/2002 | Singh et al. |
| 6,466,198 B1 | 10/2002 | Feinstein |
| 6,690,358 B2 | 2/2004 | Kaplan |
| 6,922,184 B2 | 7/2005 | Lawrence et al. |
| 6,987,504 B2 | 1/2006 | Rosenberg et al. |
| 7,038,662 B2 | 5/2006 | Noguera |
| 7,096,199 B2 | 8/2006 | Lapstun et al. |
| 2003/0008671 A1 | 1/2003 | Lundgren et al. |
| 2004/0098360 A1 | 5/2004 | Witwer et al. |
| 2004/0205484 A1 | 10/2004 | Pennington et al. |
| 2005/0073531 A1 | 4/2005 | Kuroki et al. |
| 2005/0090288 A1* | 4/2005 | Stohr et al. .................. 455/566 |
| 2005/0231474 A1* | 10/2005 | Su et al. ...................... 345/158 |
| 2006/0012584 A1* | 1/2006 | Vassallo et al. ............. 345/184 |
| 2006/0044268 A1 | 3/2006 | Robin et al. |

FOREIGN PATENT DOCUMENTS

| | | |
|---|---|---|
| WO | WO-00/21002 | 4/2000 |
| WO | WO-2006/010934 | 2/2006 |

OTHER PUBLICATIONS

International Search Report for PCT/US2007/076314 mailed Jan. 28, 2008.
Written Opinion for PCT/US2007/076314 mailed Jan. 28, 2008.
Ward et al, "A New Location Technique for the Active Office," http://lecs.cs.ucla.edu/lecs-reading/spring2001/ActiveBat.pdf#search=%22%22A%20new%20location%20technique%20for%20the%20active20%office.%22%22.
Hinckley et al., ACM UIST 2000, ftp://ftp.research.microsoft.com/pub/ejh/PPC-Sensing_bw.pdf.
Schmidt et al., "There is More to Context than Location," http://www.teco.uni-karlsruhe.de/~albrecht/publication/draft_docs/ontext-is-more-than-location.pdf.

* cited by examiner

Primary Examiner—Amare Mengistu
Assistant Examiner—Insa Sadio
(74) Attorney, Agent, or Firm—Marshall, Gerstein & Borun LLP

(57) ABSTRACT

A user may always know that on a portable media device, by pressing an input field in particular location, such as the input field to the right of the center point of a plurality of input fields, the same function may occur no matter what the orientation of the device.

5 Claims, 5 Drawing Sheets

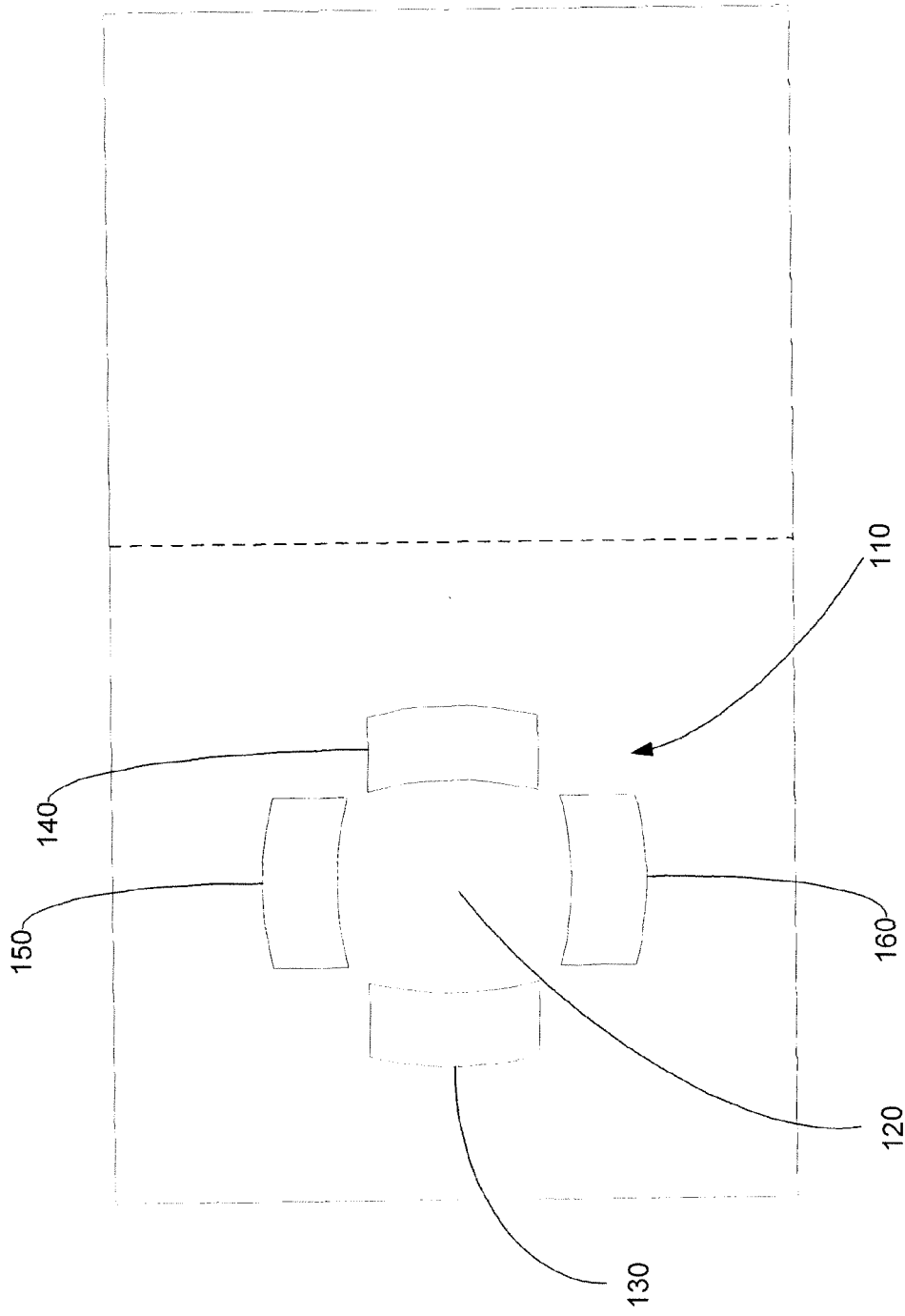
FIG. 5 (Back)

DEFINING USER INPUT FIELDS ON A PORTABLE MEDIA DEVICE

BACKGROUND

Portable media devices may be adapted to store and play a variety of file types such music files, video files and photo files on displays attached to the device or to remote devices, such as stereos, television, etc. As uses of these devices increase, the ability to usefully provide information on the display becomes more challenging. Accordingly, changing the orientation of what is displayed has been one way to provide more useful information. However, by changing the orientation of what is to be displayed, the entire device itself has to be rotated to properly view the display. Accordingly, input fields on the device also move orientation, leading to confusion as to what functions the input fields perform when the device is rotated.

SUMMARY

When a portable media device is rotated, confusion may result as to the function of input fields on the device as the input fields rotate with the device. An approach to address the confusion is to assign or map functions to input fields based on an orientation indication where the orientation indication provides the desired orientation of the media to be displayed. The orientation indication may be provided by the media, may be provided by an orientation indicator in the device or may be selected by a user. As a result of the method, a user may always know that by pressing an input field in particular location, such as the input field to the right of the center point of the input fields on the device, the same function will occur no matter what the orientation of the device.

FIGURES

FIG. 5 is an illustration of a portable media device in a horizontal orientation with the input fields on the back of the portable media device.

DESCRIPTION

Figure 1:
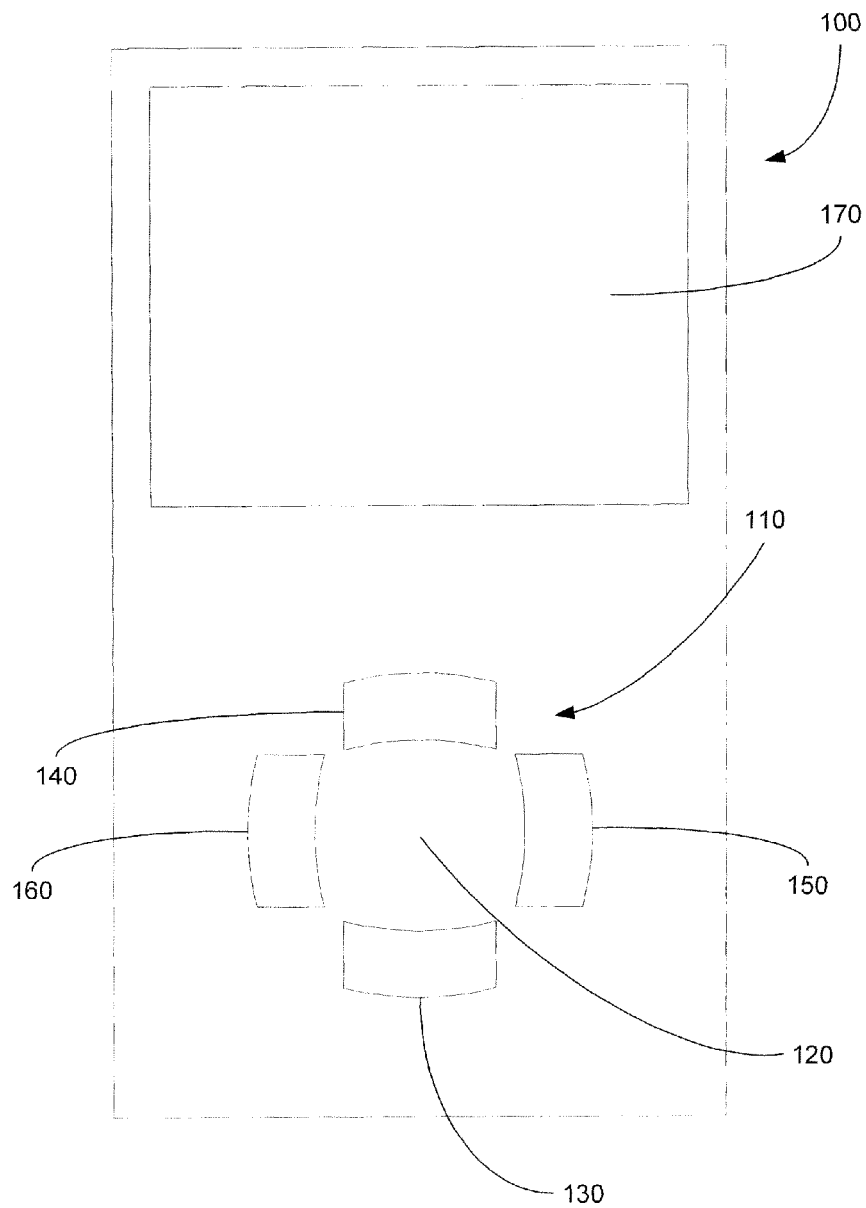
FIG. 1 is an illustration of a sample portable media device in a vertical orientation.

FIG. 1 may be an illustration of a portable media device 100. Portable media devices 100 may be adapted to store and play a variety of file types such music files (for example, wav files, mp3 files, etc.), video files (for example, wav files, mpeg files, mpeg4 files, etc.), photo files (for example, jpeg, gif, etc.) or any other type of electronic data file. Music files are not just traditional music files but also may include podcasts, voice recordings, audio books, etc. The devices 100 may also have an FM radio, an AM radio, a satellite receiver or a TV tuner to receive broadcasts from a variety of sources. Additional features are certainly available such as a WiFi ability, ability to transmit music, photos or video to another device, ability to record voices, ability to take photos or videos, ability to make telephone calls, ability to accept GPS signals and calculate locations, ability to play video games, keep calendars, keep contacts, take notes, etc. The device 100 may an input area 110 with a plurality of input fields 130, 140, 140, 150 around a center point 120 of the input area 110 in an orientation below 130, above 140, forward 150 and behind 160 the center point 120 of the input area 110 when the device 100 is in a vertical position. The device 100 may also have a display 170.

Figure 2:
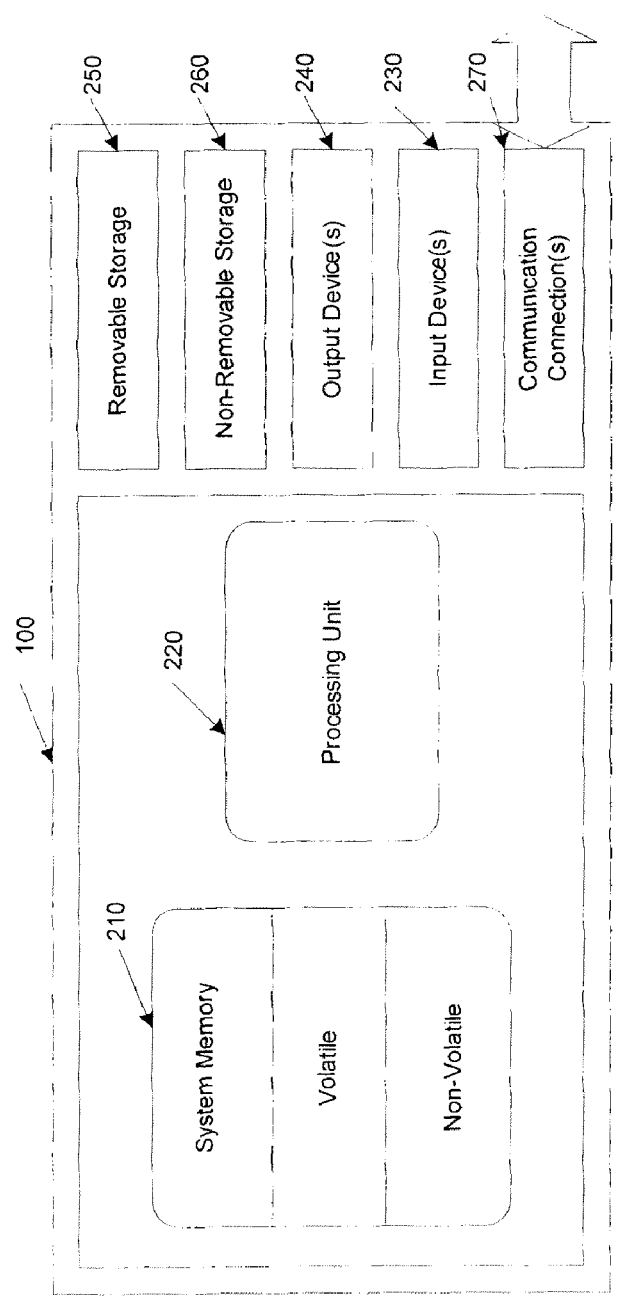
FIG. 2 is an illustration of hardware for a portable media device.

FIG. 2 may be an illustration of the hardware used in the portable media device 100. The device 100 may have a memory 210, a processing unit 220, an input device 230 such as the input area 110 with a input fields (FIG. 1) 130, 140, 150 or 160 or a touch pad that acts as the input area 110, an output device 240 such as a display 170 (FIG. 1) and a power source (not shown). The memory 210 may be volatile (such as RAM), non-volatile (such as ROM, flash memory, etc.) or some combination of the two.

The device 100 may also include additional storage (removable and/or non-removable) including, but not limited to, magnetic or optical disks or tape or any other memory that can be easily rewritten, may keep data for long periods of time when power is removed and may allow quick and efficient access to data. Such additional storage is illustrated in FIG. 2 by removable storage 250 and non-removable storage 260. Computer storage media includes volatile and nonvolatile, removable and non-removable media implemented in any method or technology for storage of information such as computer readable instructions, data structures, program modules or other data. Memory 210, removable storage 250 and non-removable storage 260 are all examples of computer storage media. Computer storage media includes, but is not limited to, RAM, ROM, EEPROM, flash memory or other memory technology. Any such computer storage media may be part of device 100.

The processing unit 220 may be any processing unit 220 capable of executing computer code to decode data from a compressed format into a useable form fast enough such that music and video may be played continuously without skips or jumps. It may also be useful if the processor 220 is efficient in using power to increase the life of the power source. The device 100 may also contain communications connection(s) 270 that allow the device 100 to communicate with other devices. Communications connection(s) 270 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The power source may be a battery that may be rechargeable. The power source may also be a standard battery, an input from a power converter or another portable power source. The display 170 may be a color LCD screen or other display type that fits inside the device 100.

The plurality of input fields 130, 140, 150, 160 may be electronic switches, such as button switches, rotating dials, tilting disks, a floating pad, a touch pad, a joystick or any appropriate input device that fits inside the media device 100 and has acceptable long term reliability. In one embodiment, the input fields 130, 140, 150, 160 may form a circle around the center point 120 of the input area 110. In another embodiment, the input fields 130, 140, 150, 160 may be aligned coaxially with the above input field 140 being above the below input field 130 on virtually the same vertical plane and the forward button 150 may be on the same horizontal plane and to the right of the behind button 140 when looking at the device 100 in a vertical orientation. In yet another embodiment, the input device is a round shape disk that pivots from a center point 120 of the input area 110 in any direction. The direction the disk pivots is the input field 130, 140, 150, 160 selected. In a further embodiment, the input fields 130, 140, 150, 160 may be actuated by a joystick type device.

In another embodiment, a touchpad in the input area 110 may be used as the input fields 130, 140, 150, 160 and the direction of a swipe across the touchpad may indicate a selection, such as a forward swipe indicating a selection of the forward button 150. Of course, many additional embodiments are possible and are contemplated. All these devices are well know in the art and need not be discussed at length here.

Figure 3:
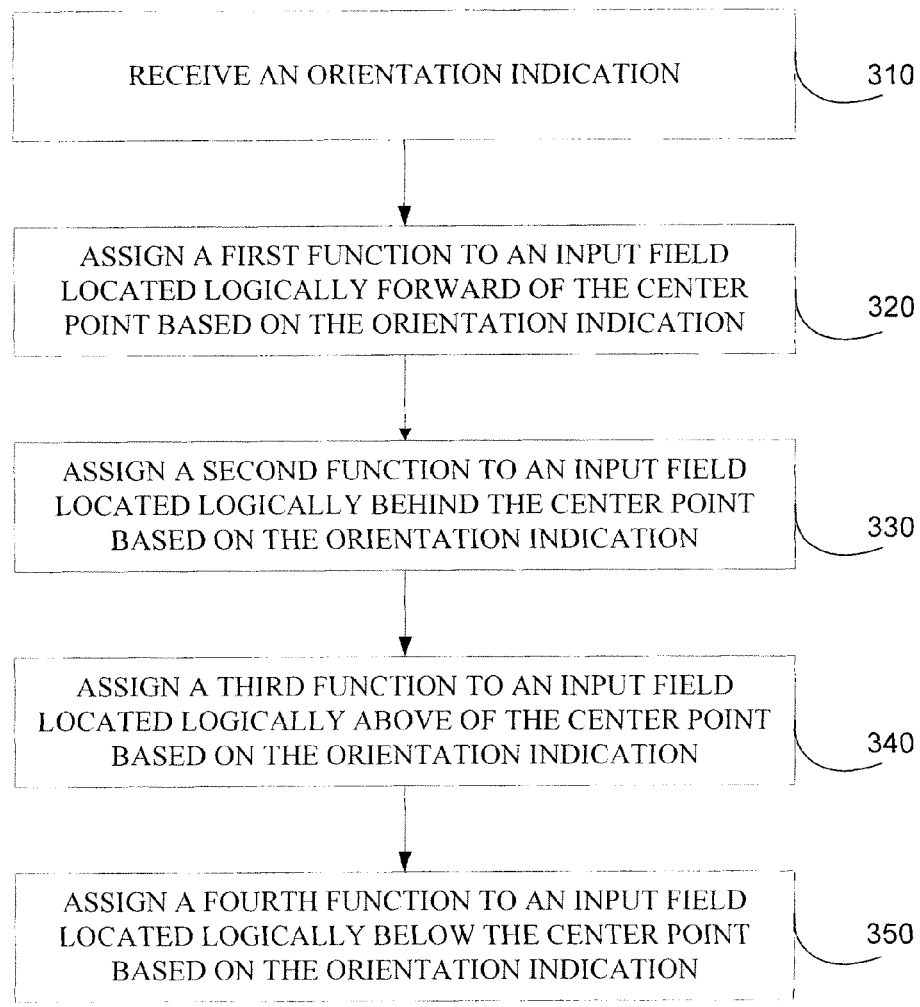
FIG. 3 is an illustration of a flowchart of a method in accordance with the claims.

FIG. 3 may be an illustration of a method of assigning functions to input fields on a portable media device 100. The input area 110 (FIG. 1) may have fields in an orientation below 130, above 140, forward 150 and behind 160 the center point 120 of the input area 110 when the device 100 is in a vertical position.

At block 310, the method may receive an orientation indication. The orientation indication may indicate the preferred orientation of the device 100. The orientation indication may be provided by a variety of sources. In one embodiment, the media selected may provide an orientation indication. For example, video media and photo media may provide a horizontal orientation indication and music media may provide a vertical orientation indication. In another embodiment, the individual file to be played may provide an orientation indication. For example, a photo taken in a vertical orientation may provide a vertical orientation indication. As another example, a piece of art associated with a music file may provide a horizontal orientation indication or vertical orientation indication, depending on the piece of art.

In yet another embodiment, the device 100 itself may provide an orientation indication. An accelerometer or other direction reporting device as known, may report the orientation of the device. By taking into account the orientation of the device 100 and the type of file to be played, the proper orientation may be reported. For example, if the device 100 is horizontal as in FIG. 4 and a picture is meant to be displayed vertically, the device 100 orientation signal may require that the picture be displayed horizontally on the display 170 such that the picture may be viewed without having to rotate the device 100.

In yet another embodiment, the orientation indication may be selected by a user. For example, the default orientation indication for photos may be to display the photo with the device 100 in a horizontal orientation. However, a user may have taken the photo intending the device 100 orientation be vertical and the user may change the orientation indication to be vertical.

In another embodiment, the orientation indication may be selected by another device or an accessory plugged into the main device such as a dock for the device 100. The device 100 itself may provide the orientation indication or the added device may provide the orientation indication.

Figure 4:
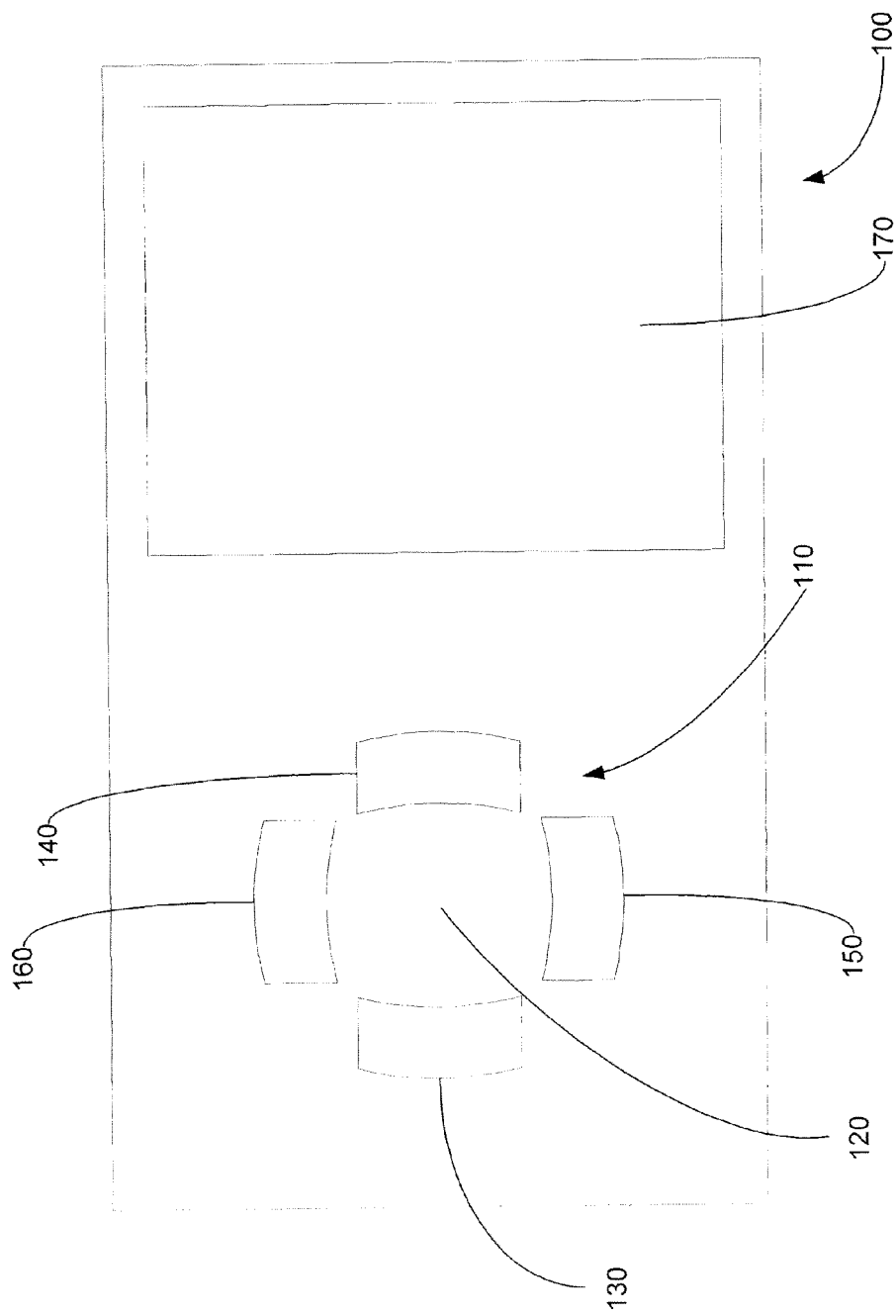
FIG. 4 is an illustration of a portable media device in a horizontal orientation.

At block 320, the method may assign or map a first function to a forward input action. The forward input action may be any type of action that indicates the desire to select the first function. In one embodiment, the forward input action may be selecting the input field 130, 140, 150, 160 located logically forward of the center point 120 of the input area 110 based on the orientation indication. Referring to FIG. 1 where the device 100 is in a vertical orientation, input field 150 is logically forward of the center point 120 of the input area 110 and would be assigned a first function. Of course, the device 100 may be in a reversed vertical orientation where the display 170 is located below the center point 120 of the input area 110 (not shown) and a similar logical assignment may occur. Referring to FIG. 4 where the device 100 in a horizontal orientation, input field 140 is logically forward of the center point 120 of the input area 110 and may be assigned the first function. Of course, the device 100 may be in a reversed horizontal orientation where the display 170 is located before the center point 120 of the input area 110 (not shown) and a similar logical assignment may occur. Referring to FIG. 5 where the input area 110 swivels to be on the side opposite the display 170, input field 140 is logically forward of the center point 120 of the input area 110 and may be assigned the first function. Virtually any type of rotation between the input area 110 and the display 170 may be taken into account and a logical assignment of input fields 130, 140, 150, 160 to functions may occur.

In another embodiment where a touch pad is used, the forward input action may be a swipe action on a touchpad in a particular manner in relation to the center point 120 of the input area 110. For example, referring to FIG. 1, a swipe starting from behind the center point 120 of the input area 110 and ending forward of center point 120 of the input area 110 may be a forward input action. Even if the device 100 is rotated to a horizontal position such as in FIG. 4, a swipe starting from behind the center point 120 of the input area 110 and ending forward of center point 120 of the input area 110 may be a forward input action.

In one embodiment, the first function may be a forward function. A forward function may be a function that is logically related to moving forward through a series of menus or through media. Some sample forward functions may include fast forward, next track, next photo, slideshow forward, next chapter and scan forward. The forward function may depend on the media being played. For example, if viewing photos, the forward function may indicate next photo or slideshow forward while if listening to music, the forward function may indicate fast forward or next music track.

At block 330, the method may assign or map a second function to a reverse input action. The reverse input action may be any type of action that indicates the desire to select the second function. In one embodiment, the reverse input action may be selecting an input field 130, 140, 150, 160 located logically behind the center point based on the orientation indication. Referring to FIG. 1 where the device 100 is in a vertical orientation, input field 150 is logically behind the center point 120 of the input area 110 and would be assigned the second function. Referring to FIG. 4 where the device 100 in a horizontal orientation, input field 130 is logically behind the center point 120 of the input area 110 and may be assigned the second function. Referring to FIG. 5 where the input area 110 swivel to be on the side opposite the display 170, input field 130 is logically behind the center point 120 of the input area 110 and may be assigned the second function.

In another embodiment where a touch pad is used, the reverse input action may be a swipe action on a touchpad in a particular manner in relation to the center point 120 of the input area 110. For example, referring to FIG. 1, a swipe starting from a forward position of the center point 120 of the input area 110 and ending behind the center point 120 of the input area 110 may be a reverse input action. Even if the device 100 is rotated to a horizontal position such as in FIG. 4, a swipe starting from a forward position of the center point 120 of the input area 110 and ending behind the center point 120 of the input area 110 may be a reverse input action.

In one embodiment, the second function may be a reverse function. A reverse function may be a function that is logically related to moving backward through a series of menus or through media. Some sample reverse functions may include rewind, previous track, previous photo, slideshow backward, previous chapter and scan backward. The reverse function may depend on the media being played. For example, if viewing photos, the reverse function may indicate previous photo or slideshow backward while if listening to music, the reverse function may indicate rewind or previous music track.

At block 340, the method may assign or map a third function to an above input action. The above input action may be any type of action that indicates the desire to select the third function. In one embodiment, the above input action may be any type of action to the input fields 130, 140, 150, 160 that indicates the desire to select the third function. In one embodiment, the input action may be the selection of an input field 130, 140, 150, 160 located logically above the center point based on the orientation indication. Referring to FIG. 1 where the device 100 is in a vertical orientation, input field 140 is logically above the center point 120 of the input area 110 and would be assigned the third function. Referring to FIG. 4 where the device 100 in a horizontal orientation, input field 160 is logically above the center point 120 of the input area 110 and may be assigned the third function. Referring to FIG. 5 where the input area 110 swivels to be on the side opposite the display 170, input field 150 is logically above the center point 120 of the input area 110 and may be assigned the third function.

In another embodiment where a touch pad is used, the above input action may be a swipe action on a touchpad in a particular manner in relation to the center point 120 of the input area 110. For example, referring to FIG. 1, a swipe starting from below the center point 120 of the input area 110 and ending above the center point 120 of the input area 110 may be considered an above input action. Even if the device 100 is rotated to a horizontal position such as in FIG. 4, a swipe starting from below the center point 120 of the input area 110 and ending above the center point 120 of the input area 110 may be considered an above input action.

In one embodiment, the third function may be an increase function. An increase function may be a function that is logically related to increasing something on the device, such as increasing volume or moving up through a menu system or media. The increase function may depend on the state of the device 100. If the device 100 is playing music, the increase function may increase the volume and if the device is displaying a menu, the increase function may move up through the menu options.

At block 350, the method may assign or map a fourth function to a below input action. The below input action may be any type of action that indicates the desire to select the fourth function. In one embodiment, the below input action may be the selection of an input field 130, 140, 150, 160 located logically below the center point 120 of the input area 110 based on the orientation indication. Referring to FIG. 1 where the device 100 is in a vertical orientation, input field 130 is logically below the center point 120 of the input area 110 and would be assigned the fourth function. Referring to FIG. 4 where the device 100 in a horizontal orientation, input field 150 is logically below the center point 120 of the input area 110 and may be assigned the fourth function. Referring to FIG. 5 where the input area 110 swivels to be on the side opposite the display 170, input field 160 is logically below the center point 120 of the input area 110 and may be assigned the fourth function.

In another embodiment where a touch pad is used, the below input action may be a swipe action on a touchpad in a particular manner in relation to the center point 120 of the input area 110. For example, referring to FIG. 1, a swipe starting from above the center point 120 of the input area 10 and ending below the center point 120 of the input area 110 may be a below input action. Even if the device 100 is rotated to a horizontal position such as in FIG. 4, a swipe starting from above the center point 120 of the input area 110 and ending below the center point 120 of the input area 110 would be considered a below input action.

In one embodiment, the fourth function may be a decrease function. The decrease function may be a function that is logically related to decreasing something on the device 100 such as volume or moving down through a menu. The decrease function may depend on the media being played. For example, if listening to music, the decrease function may include volume information while in other situations, the decrease function may simply move a curser down a menu.

Input actions may be accomplished in a variety of ways. Inputs to the input fields 130, 140, 150, 160 of the input area 110 may be a number of physical contacts to the input fields 130, 140, 150, 160 of the input area 110 during a predetermined length of time or continuous contact for the predetermined length of time. Depending on the mode of the device 100, a single contact to a input field 130, 140, 150, 160 for a predetermined length of time may have a first function, a double contact to an input field 130, 140, 150, 160 for a predetermined length of time may have a second function and continuous contact to an input field 130, 140, 150, 160 for a predetermined length of time may have a third function. For example, while listening to a music file, a first physical contact to the forward input field 150 (FIG. 1) may result in the function of scan forward at 2× speed, and a second physical contact within a predetermined period of time to the forward input field 150 may result in the function of scan forward at 3× speed.

In another embodiment where a touch pad is used, the input fields 130, 140, 150 and 160 may be accessed by swiping the input area 110 in a particular manner in relation to the center point 120 of the input area 110. For example in FIG. 1, a swipe starting from a point below the center point 120 of the input area 110 and ending above the center point 120 of the input area 110 may be a selection of the above field 140 while a swipe starting forward of the center point 120 of the input area 110 and continuing behind the center point 120 of the input area 110 would be considered a selection of the behind field 160, without regard to the orientation of the device.

As a result of the method, a user may always know that by pressing an input field 130, 140, 150, 160 in particular location, such as the input field 130, 140, 150, 160 to the right of the center point 120 of the input area 110 on the device 100, the same function will occur no matter what the orientation of the device 100.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

We claim:

1. A portable media device comprising:
   a housing;
   a display mounted on the housing;
   a memory that stores computer executable instructions and in which music files can be stored;
   a processor being adapted to execute the computer executable instructions stored in the memory;
   a reporting device that is adapted to provide an orientation indication signal that is generally representative of an orientation of the portable music player;
   at least four actuatable keys peripherally arranged around a center point on the housing, the at least four actuatable keys extending perpendicularly away from the housing to provide tactile feedback to a user when the user grasps the portable media device and touches one or more of the at least four actuatable keys;
   wherein, when the portable media device is disposed in a first orientation, first, second, third and fourth ones of the at least four keys are disposed in an orientation below, above, forward and behind the center point;
   wherein, when the portable media device is disposed in a second orientation in which the housing is rotated 180 degrees about the axis defined by the center point away from the first orientation, the first, second, third and fourth ones of the at least four keys are disposed in an orientation above, below, right and left of the center point;
   wherein the computer executable instructions comprising instructions for receiving the orientation indication from the reporting device;
   wherein the computer executable instructions include a first set of instructions that, when executed by the processor, assigns a first portable media player function to the first key when the portable media player device is disposed in the first orientation and, when the orientation of the portable media player is changed to the second orientation, assigns the first portable media player function to the second key;
   wherein the computer executable instructions include a second set of instructions that, when executed by the processor, assigns a second portable media player function to the second key when the portable media player device is disposed in the first orientation and, when the orientation of the portable media player is changed to the second orientation, assigns the second portable media player function to the first key;
   wherein the computer executable instructions include a third set of instructions that, when executed by the processor, assigns a third portable media player function to the third key when the portable media player device is disposed in the first orientation and, when the orientation of the portable media player is changed to the second orientation, assigns the third portable media player function to the fourth key;
   wherein the computer executable instructions include a fourth set of instructions that, when executed by the processor, assigns a fourth portable media player function to the fourth key when the portable media player device is disposed in the first orientation and, when the orientation of the portable media player is changed to the second orientation, assigns the fourth portable media player function to the fourth key;
   a tuner that is adapted to receive radio signals and play the received radio signals, actuation of the third and fourth keys allowing a user to increase and decrease, respectively, the volume of the played radio signals; and
   wherein the portable media device is designed so that a user can choose to activate a particular one of the first, second, third and fourth portable media functions only by means of the tactile feedback that is given to a user when a user grasps the portable media device and touches the first, second, third and fourth keys.

2. The portable media player of claim 1, wherein the first portable media player function comprises a forward function that, when executed, allows a user to stop playing a first music file stored in the memory and start playing a second music file stored in the memory.

3. The portable media player of claim 2, wherein the second portable media player function comprises a reverse function that, when executed, allows a user to cause the portable media device to stop playing the second music file and start playing the first music file.

4. The portable media player of claim 3, wherein the third portable media player function comprises an increase function that, when executed at a time when a third music file from the memory is being played, a user can increase the volume of the played third music file.

5. The portable media player of claim 4, wherein the fourth portable media player function comprises a decrease function that, when executed at a time when a fourth music file from the memory is being played, a user can decrease the volume of the played fourth music file.

\* \* \* \* \*